United States Patent Office 3,125,580
Patented Mar. 17, 1964

3,125,580
N-(3,3 - DIPHENYL - 3 - ALKANOYL)PROPYLSPIRO (TETRALIN - 1,4' - PIPERIDINES) AND RELATED COMPOUNDS
Paul A. J. Janssen, Vosselaar, near Turnhout, Belgium, assignor to Research Laboratorium Dr. C. Janssen, N.V., Beerse, Belgium, a company of Belgium
No Drawing. Filed Oct. 10, 1961, Ser. No. 144,018
10 Claims. (Cl. 260—293)

The present invention relates to a novel group of spiropiperidine derivatives. More particularly, it relates to compounds of the general structural formula

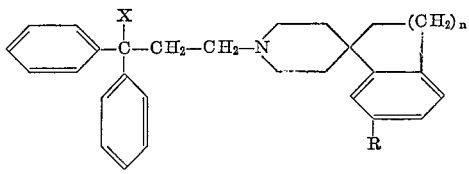

and the pharmaceutically equivalent, non-toxic salts thereof, wherein X represents cyano or —CO-(lower alkyl); $n$ is a positive integer less than 3; and R represents hydrogen or methyl.

The lower alkyl radicals referred to above contain less than 7 carbon atoms; typical examples are methyl, ethyl and propyl. The organic bases of this invention form pharmaceutically acceptable salts with a variety of inorganic and strong organic acids including sulfuric, phosphoric, hydrochloric, hydrobromic, hydriodic, sulfamic, citric, lactic, malic, maleic, succinic, tartaric, cinnamic, acetic, benzoic, gluconic, ascorbic, and related aids. They also form quaternary ammonium salts with a variety of organic esters of sulfuric, hydrohalic and aromaticsulfonic acids. Among such esters are methyl chloride and bromide, ethyl chloride, propyl chloride, butyl chloride, isobutyl chloride, benzyl chloride and bromide, phenylethyl bromide, naphthylmethyl chloride, dimethyl sulfate, diethyl sulfate, methyl benzenesulfonate, ethyl toluenesulfonate, ethylene chlorohydrin, propylene chlorohydrin, allyl bromide, methallyl bromide, and crotyl bromide.

The compounds of this invention are useful because of their valuable pharmacological properties. They are potent analgesics with a relatively long duration of activity. They also possess mydriatic activity.

The compounds of this invention can be advantageously prepared by the reaction of a compound of the structural formula

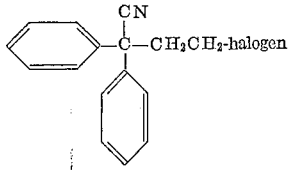

with an appropriately selected amine of the formula

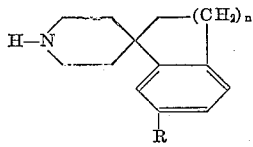

wherein $n$ and R are defined as above. The reaction can be carried out in an inert solvent such as an aromatic hydrocarbon (e.g. benzene, toluene), a lower alkanol (e.g. butanol) or a lower alkanone (e.g. 4-methyl-2-pentanone). The reaction can be accelerated by use of elevated temperatures. The 3-[CO-(lower alkyl)]propyl derivatives are obtained by the reaction of the appropriate Grignard reagent of the formula (lower alkyl)Mg-halogen with the nitrile obtained above.

The intermediate piperidines described above can be conveniently prepared by the following series of reactions:

An appropriate hydroaryl ketone is reacted with ethyl α-cyanoacetate to give a compound of the formula

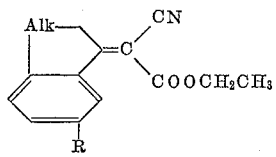

which is mixed with sodium ethoxide and α-cyanoacetamide to produce a compound of the formula

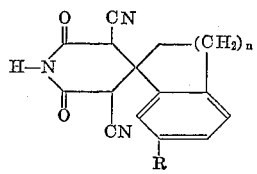

This product is hydrolyzed to yield a compound of the formula

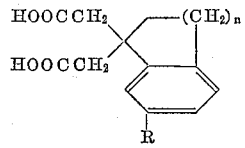

The latter material is reduced with lithium aluminum hydride to form the dialcohol which is then treated with a hydrogen halide to form the dihalide. This dihalide is reacted with an appropriate amine to yield a compound of the formula

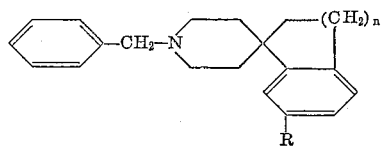

This compound is subsequently debenzylated with cyanogen bromide and chloroform followed by hydrolysis of the obtained N-cyanoamide or, alternatively, with hydrogen in the presence of a palladium-on-charcoal catalyst.

The compounds which constitute this invention and their methods of preparation will appear more fully from a consideration of the following examples, which are given for the purpose of illustration only and are not to be construed as limiting the invention in spirit or in scope. In these examples, quantities are indicated in parts by weight, temperatures in degrees centigrade (° C.), and pressure in millimeters of mercury (mm.).

*Example 1*

A mixture of 146 parts of 1-tetralone, 113 parts of ethyl α-cyanoacetate, 50 parts of acetic acid and 16 parts of ammonium acetate in 240 parts of toluene is refluxed for 6 hours in a vessel provided with a reflux condenser and water separator. After the calculated amount of water is separated, the reaction mixture is cooled and washed with about 2,000 parts of water. The organic solution is dried over potassium carbonate and filtered. The residue is distilled in vacuo to yield ethyl α-cyano-α-(1-tetralylidene)acetate, boiling at about 154–157° C. at 0.3 mm. pressure.

By substituting the appropriate ketone for the 1-tetralone of the above procedure and repeating the above procedure, one obtains:

Ethyl α-cyano-α-(1-indanylidene)acetate, melting at about 98–100.6° C.

Ethyl α-cyano - α - [1-(7-methyl)tetralylidene]-acetate, boiling at about 189–195° C. at 0.4 mm. pressure.

Example 2

To a solution of 25.6 parts of sodium dissolved in 960 parts of ethanol there is added portionwise 92.4 parts of α-cyanoacetamide. After the portionwise addition of 250 parts of ethyl α-cyano-α-(1-tetralylidene)acetate, the whole is stirred for 20 hours at room temperature. The reaction mixture is decomposed with 500 parts of water and the aqueous layer acidified with hydrochloric acid. The resultant precipitate is filtered off and washed with diisopropyl ether. Upon drying, there is obtained tetralin-1,1-(α,α'-dicyano)diacetic acid imide, melting at about 284–202° C. This compound has the formula

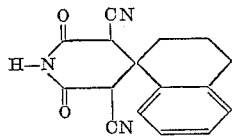

By substituting the appropriate acetic ester derivative for the ethyl α-cyano-α-(1-tetralylidene)acetate of the above paragraph in the above procedure, there is obtained:

Indan-1,1-(α,α'-dicyano)diacetic acid imide, melting at about 260–268° C.

7-methyltetralin-1,1-(α,α'-dicyano)diacetic acid imide, melting at about 290.4–295.2° C.

Example 3

A mixture of 250 parts of tetralin-1,1-(α,α'-dicyano)-diacetic acid imide, 1800 parts of concentrated sulfuric acid, 1170 parts of water, and 960 parts of acetic acid is stirred and refluxed for 96 hours. After cooling, the mixture is poured into 2000 parts of water. The precipitate which is first filtered and dried is recrystallized from a mixture of 2000 parts of water and 400 parts of ethanol. The precipitate which forms is filtered, washed with water and dried, yielding tetralin-1,1-diacetic acid, melting at about 146–149° C.

By substituting the appropriate imide in the above procedure, the following compounds are obtained:

Indan-1,1-diacetic acid, melting at about 120–123.8° C.

7-methyltetralin-1,1-diacetic acid, melting at about 145–150° C.

Example 4

To a stirred solution of 30 parts of lithium aluminum hydride in 400 parts of tetrahydrofuran, there is added portionwise, while refluxing, a solution of 98 parts of tetralin-1,1-diacetic acid in 400 parts of tetrahydrofuran. Upon completion of the addition, the whole is refluxed for 6 hours, then the reaction mixture is cooled and decomposed with 110 parts of water. After filtration, the filtrate is evaporated and the residue which remains is dissolved in 640 parts of toluene. By cooling at about —15° C., there is obtained 1,1-bis(2-hydroxyethyl)-tetralin, melting at about 120–121° C.

Substitution of the appropriate dicaboxylic acid derivative in the above procedure yields:

1,1-bis(2-hydroxyethyl)indan, melting at about 82.5–86° C.

1.1 - bis(2 - hydroxyethyl) - 7 - methyltetralin, melting at about 84–86° C.

Example 5

A thick-walled tube is charged with a mixture of 24.5 parts of 1,1-bis(2-hydroxyethyl)tetralin in 140 parts of aqueous 46% hydrogen bromide solution and placed in a cooling ice-salt bath. At a temperature of —10° C., the mixture is saturated with gaseous hydrogen bromide. The tube is then sealed and the mixture is heated for 24 hours at 100° C. The system is cooled to —10° C., saturated with gaseous hydrogen bromide and the sealed tube is heated again to 100° C. for 24 hours. After cooling, the reaction mixture is poured into 1,000 parts of water, and the aqueous layer extracted with ether. The etheric solution is dried and filtered and the residue distilled in vacuo, to yield 1,1-bis(2-bromoethyl)tetralin, boiling at about 156–159° C. at 0.1 mm. pressure.

Upon substitution of the appropriate alcohol for the 1,1-bis(2-hydroxyethyl)tetralin and repeating the above procedure, the following compounds are obtained:

1,1-bis(2-bromoethyl)indan, boiling at about 142–145° C. at 0.1 mm. pressure.

1,1-bis(2-bromoethyl)-7-methyltetralin.

Example 6

A mixture of 79 parts of 1,1-bis(2-bromoethyl)-tetralin, 90 parts of benzylamine, 240 parts of toluene and 0.05 part potassium iodide is heated in a sealed tube for about 48 hours at 150° C. After cooling, the reaction mixture is filtered and the filtrate washed with 2,000 parts of water. The oragnic layer is dried over potassium carbonate, filtered and evaporated. After dissolving the residue in 800 parts of anhydrous diisopropyl ether, hydrogen chloride gas is introduced into the solution. The precipitated hydrochloride is filtered off and extracted with 1500 parts of boiling water. After filtration of this aqueous solution, the precipitate is dried at 100° C. to yield 1'-benzylspiro-[tetralin-1,4'-piperidine] hydrochloride, melting at about 285–287° C. This compound has the formula

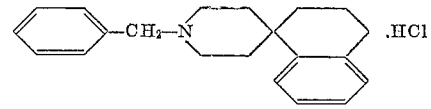

Substitution of the appropriate dibromide for the 1,1-bis(2-bromoethyl)tetralin in the above procedure gives the following compounds:

1' - benzylspiro[indan - 1,4' - piperidine] hydrochloride, melting at about 280–282° C.

1' - benzylspiro[7 - methyltetralin - 1,4' - piperidine] hydrochloride, melting at about 247–248.6° C.

Example 7

To a solution of 26 parts of 1'-benzylspiro[tetralin-1,4'-piperidine], which is liberated by evaporation of the solvent from the chloroform extracts of an alkalized aqueous solution of the hydrochloride salt in 96 parts of chloroform, there is added at room temperature a solution of 15 parts of cyanogen bromide in 96 parts of chloroform. Upon completion of this addition, the mixture is refluxed for 15 hours, then cooled and washed with 2,000 parts of water. After drying this chloroform solution over calcium chloride, it is filtered and evaporated. The solid residue is dissolved in ethanol, filtered and cooled at —20° C. to yield 1'-cyanospiro[tetralin-1,4'-piperidine], melting at about 146–147.5° C.

Substitution of 1'-benzylspiro[indan-1,4'-piperidine] for the piperidine derivative in the above procedure yields 1'-cyanospiro[indan-1,4'-piperidine], melting at about 146–149° C.

Example 8

A mixture of 15 parts of 1'-cyanospiro[tetralin-1,4'-piperidine] and 300 parts of 6% hydrochloric acid is refluxed for 20 hours. After cooling the reaction mixture, the formed precipitate is filtered off to yield spiro[tetralin-1,4'-piperidine] hydrochloride, melting at about 300° C.

Substitution of 1-cyanospiro[indan-1,4'-piperidine] for the spiropiperidine derivative in paragraph 1 above yields spiro[indan-1,4'-piperidine] hydrochloride, melting at about 288–290° C.

Example 9

A mixture of 29 parts of 1'-benzylspiro[7-methyltetralin-1,4'-piperidine] hydrochloride, 320 parts of isopropyl alcohol, and 160 parts of water is hydrogenated under atmospheric pressure at room temperature in the presence of 8 parts of 10% palladium-on-charcoal catalyst. After the calculated amount of hydrogen is taken up, the reaction is stopped. The charcoal is filtered off, and the filtrate is evaporated. Subsequent recrystallization of the residue from 80 parts of ethanol and 80 parts of isopropanol affords spiro[7-methyltetralin-1,4'-piperidine] hydrochloride, melting at about 342–350° C.

Example 10

A mixture of 18 parts of γ,γ-diphenyl-γ-cyanopropyl bromide, 11.4 parts of spiro[indan-1,4'-piperidine], isolated from the hydrochloride (by evaporation of the benzene extract of an alkalized aqueous solution of the salt), 8.5 parts of sodium carbonate and 0.05 part potassium iodide in 640 parts of 4-methyl-2-pentanone is stirred and refluxed for 48 hours. After cooling, the reaction mixture is filtered and the filtrate evaporated. This residue is dissolved in anhydrous ether followed by the introduction of hydrogen chloride gas into the solution to yield, after recrystallization from a mixture of isopropanol and acetone, 1'-(3,3-diphenyl-3-cyanopropyl)-spiro[indan - 1,4' - piperidine]hydrochloride, melting at about 227.4–229° C. The free base of this compound has the formula

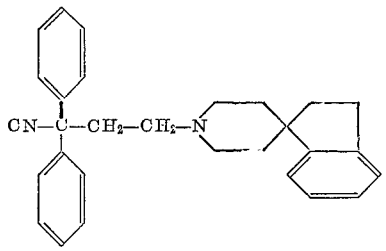

Example 11

By substitution of the appropriate piperidine derivative for indan-1,4'-piperidine in the procedure of Example 10, the following compounds are obtained:

1'-(3,3 - diphenyl - 3 - cyanopropyl)spiro[tetralin-1,4'-piperidine], melting at about 144.2–145.6° C. The hydrochloride monohydrate melts at about 138–159° C., with decomposition.

1'-(3,3-diphenyl - 3 - cyanopropyl)spiro[7-methyltetralin-1,4'-piperidine], melting at about 164–165° C.

Example 12

To a solution of methylmagnesium iodide prepared by the addition of 8.5 parts of methyl iodide to 1.44 parts of magnesium in 40 parts of anhydrous ether, there is added portionwise a solution of 12.6 parts of 1'-(3,3-diphenyl - 3 - cyanopropyl)spiro[tetralin-1,4'-piperidine] in 120 parts of toluene, while the ether is being distilled through a condenser. The residue is refluxed for 15 hours. The reaction mixture is decomposed with about 100 parts of 20% hydrochloric acid and boiled for 8 hours. After cooling, the organic layer is separated and evaporated. This aqueous layer is made alkaline with 10% sodium hydroxide and extracted with ether. The toluene layer residue is dissolved in boiling water and this solution is treated with sodium hydroxide solution and extracted with ether. This extract is added to the etheric solution which was first obtained. The combined solutions are dried over potassium carbonate, filtered and evaporated. To prepare the hydrochloride derivative, the above residue is dissolved in anhydrous ether, then hydrogen chloride gas is introduced. The precipitated hydrochloride is filtered off to yield, after recrystallization from acetone, 1'(3,3-diphenyl-3-acetylpropyl)spiro-[tetralin-1,4'-piperidine] hydrochloride, melting at about 245–246° C. The corresponding oxalate can be obtained by mixing a 2-propanol solution of the free base of the above hydrochloride with a 2-propanol solution of oxalic acid dihydrate. The free base of the above compound has the formula

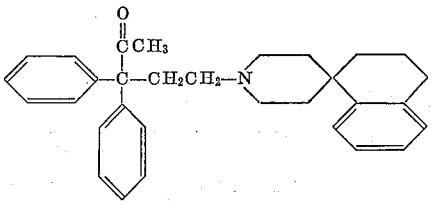

Example 13

Substitution of ethyl bromide for the methyl iodide of Example 12 and repeating the procedure yields 1'-(3,3-diphenyl - 3 - propionylpropyl)spiro[tetralin-1,4'-piperidine]oxalate, melting at about 207–209° C.

Substitution of n-propyl magnesium bromide for the iodide of Example 12 yields 1'-(3,3-diphenyl-3-butyrylpropyl)spiro[tetralin-1,4'-piperidine]oxalate, melting at about 206–207° C.

Example 14

Substitution of the appropriate cyanopropylspiropiperidine derivative in the procedure of Example 12 affords 1'-(3,3 - diphenyl-3-acetylpropyl)spiro[indan-1,4'-piperidine]hydrochloride.

Substitution of ethyl bromide and 1'-(3,3-diphenyl-3-cyanopropyl)spiro[indan-1,4'-piperidine] for the iodide and piperidine derivative of Example 12 and repeating the procedure yields 1'-(3,3-diphenyl-3-propionylpropyl)-spiro[indan-1,4'-piperidine]oxalate, melting at about 185–189° C.

Example 15

Substitution of ethylmagnesium bromide for the methylmagnesium iodide and 1'-(3,3-diphenyl-3-cyanopropyl)-spiro[7-methyltetralin-1,4'-piperidine] for the spiro[tetralin-1,4'-piperidine] derivative and repeating the procedure of Example 12 yields 1'-(3,3-diphenyl-3-propionylpropyl)spiro[7-methyltetralin-1,4'-piperidine] oxalate, melting at about 190–191° C.

What I claim is:

1. A compound of the formula

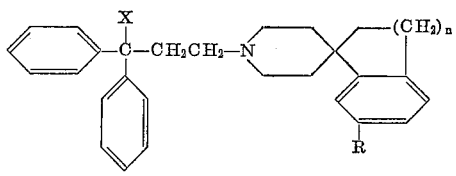

wherein X is selected from the group consisting of cyano and —CO-(lower alkyl); n is a positive integer less than 3; and R is selected from the group consisting of hydrogen and methyl.

2. A compound of the formula

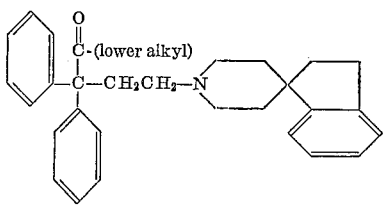

3. 1'-(3,3-diphenyl - 3 - propionylpropyl)spiro[indan-1,4'-piperidine].

4. A compound of the formula

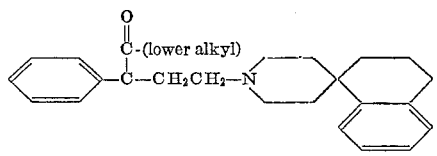

5. 1'-(3,3 - diphenyl-3-acetylpropyl)spiro[tetralin-1,4'-piperidine].
6. 1'(3,3 - diphenyl-3-propionylpropyl)spiro-[tetralin-1,4'-piperidine].
7. 1'-(3,3-diphenyl - 3 - butyrylpropyl)spiro-[tetralin-1,4'-piperidine].
8. 1'-(3,3 - diphenyl-3-propionylpropyl)spiro[7-methyl-tetralin-1,4'-piperidine].

9. A compound of the formula

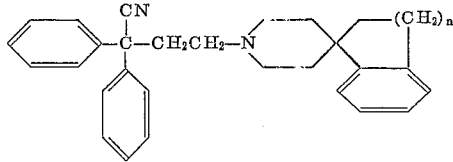

wherein $n$ is a positive integer less than 3.

10. 1'-(3,3 - diphenyl - 3 - cyanopropyl)spiro[tetralin-1,4'-piperidine].

References Cited in the file of this patent
UNITED STATES PATENTS 3,028,389    Kasparek _____ Apr. 3, 1962

FOREIGN PATENTS 503,236    Canada _____ May 25, 1954